Jan. 23, 1968   G. MATLOW ET AL   3,364,688
CRYOGENIC CONTAINER MEANS
Filed April 15, 1966
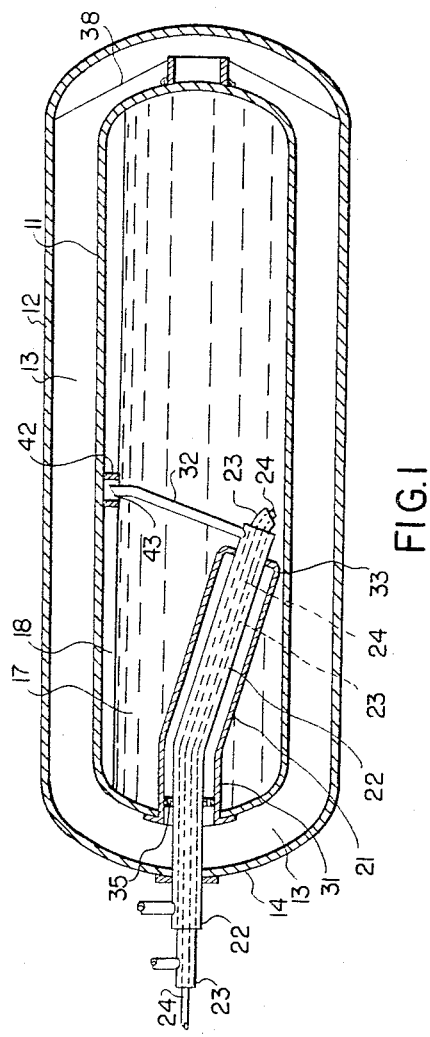
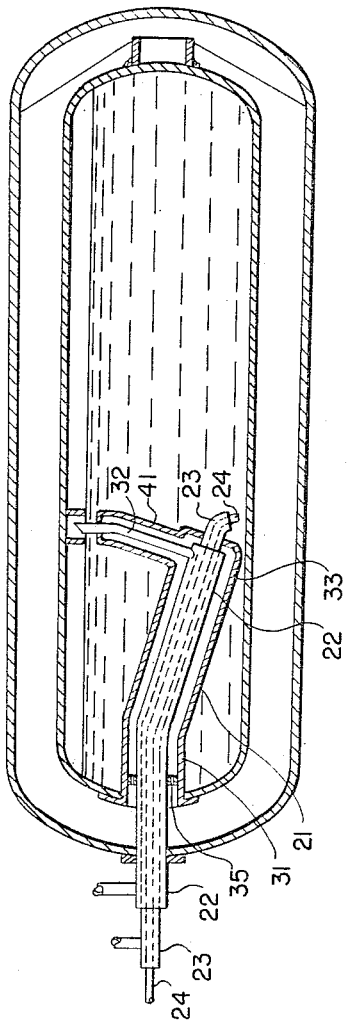
INVENTORS
GEORGE MATLOW
RICHARD S. PAULIUKONIS
BY
MC NENNY, FARRINGTON, PEARNE & GORDON
ATTORNEYS United States Patent Office
3,364,688
Patented Jan. 23, 1968

1

3,364,688
CRYOGENIC CONTAINER MEANS
George Matlow and Richard S. Pauliukonis, Cleveland, Ohio, assignors to Ryan Industries, Inc., a corporation of Ohio
Filed Apr. 15, 1966, Ser. No. 542,950
13 Claims. (Cl. 62—45)

This invention relates to Dewars and particularly to Dewars of economically fabricated cylindrical shape, or other generally similar shapes having greater length than width and intended to be oriented horizontally when in use. Dewars of this type will be referred to herein as Dewars of horizontal configuration.

From the standpoint of cost of fabrication, shell strength, and similar practical considerations, it is generally desirable in many horizontal Dewar applications to provide fluid conduits from one of the ends or "heads" of the horizontal Dewar. In the most simple preferred design these conduits may be located at the axial center of the horizontal Dewar. An example is found in Skinner U.S. Patent 2,998,708. Such conduits may desirably furnish structural support so that they act as suspension elements as well as functioning as conduits.

Indeed it is generally desirable in all cryogenic Dewars to use the conduits themselves as structural supports to the extent possible, because this avoids the necessity of adding additional structural members which themselves provide additional paths of heat inleak. However there have been certain serious drawbacks associated with the provision of horizontally extending dual-function fluid conduits. Although both the fluid transmission and support functions are desirably combined, the extension of the fluid conduits to the interior of the inner vessel exposes them directly to heat exchange with the extremely cold liquefied fluid held within the inner vessel. Vapors within the fluid conduit tend to condense at the coldest (innermost) parts of the conduit and to flow toward the warm (outermost) end where they pick up heat and vaporize. In their vapor state they are free to move back to the cold end. This percolation action can involve a significant amount of heat inleak. Entirely aside from the percolation cycle just described, convective currents may be established within the conduits. Thus cooling of vapor at the cold end of the conduit and warming of the vapor at the warm end of the conduit tend to establish a circulation of gas along the length of the conduit. This convection represents additional heat inleak.

Percolation and convection along horizontal fluid conduits may be avoided by providing suitable traps or bends in the fluid lines between the inner and outer vessels of the Dewar. This is a conventional expedient and is widely used. However when the configuration of the conduits is such that percolation and convection is effectively prevented, the mechanical effectiveness of the conduits as beams or hangers is severely reduced, if not substantially eliminated; and extra suspension elements must be provided, thereby creating additional paths of heat inleak. In other words, side-entering fluid conduits for horizontal Dewars, when suitably designed to prevent heat inleak through percolation and convection, have required provision of extra suspension elements, at a cost in over-all heat inleak. On the other hand, avoidance of the use of extra suspension elements by employing the conduits themselves as suspension elements has been accomplished only at the cost of an increase in over-all heat inleak caused by percolation or convection as described. The present invention provides a structure where the fluid conduits entering at one end of a horizontal Dewar perform a dual function, in the absence of significant convection and/or percolation of fluids within the conduits.

2

In the drawings:
FIGURE 1 is a schematic cross-sectional view of a portion of a horizontal Dewar illustrating the invention.
FIGURE 2 is a schematic cross-sectional view of another Dewar illustrating another embodiment of the invention.

In FIGURE 1 there is shown a horizontally oriented Dewar comprising an inner vessel 11 and an outer shell 12 separated by a vacuum space 13, which may contain a suitable insulation filler (not shown). The vessel is shown filled with liquefied gas 17. Above the liquid is defined the ullage space 18 of the vessel.

The vessel is provided with conduit means including a vent line 22, a fill line 23, and a discharge or withdrawal line 24. The vent line 22 communicates with the interior of the inner vessel near the top thereof.

The fill line 23 and the discharge or withdrawal line 24 together comprise fill-discharge line means which, in the illustrated embodiment, extend from the exterior at or near the center of the head 14 of the vessel across the vacuum space 13 and to and along a vacuum jacket 21 located within the inner vessel 11. The vacuum jacket 21 extends from its conduit-receiving portion or end 31 at the head of the inner vessel downwardly within the inner vessel at least to a low portion 33 near the bottom of the inner vessel. A structural interconnection is provided between the conduits and the inner vessel 11. In each illustrated embodiment, this interconnection has the form of a collar or spacer 35 provided with holes through which the vacuum space 13 communicates with the lower interior of the vacuum jacket 21. In each illustrated embodiment, the collar or spacer 35 interconnects the outermost fluid conduit (here conduit 22) and the inner vessel 11 via a short length of the conduit-receiving end 31 of the vacuum jacket 21, although of course the connection may be directly between the outermost conduit and the head of the inner vessel if desired. The other end of the inner vessel may if necessary be supported by suitable means such as rods or wires 38 tensioned between the outer shell 12 and an end collar on the inner vessel 11.

The discharge line 24 communicates with the interior of the inner vessel 11 near the bottom thereof and after passing along through the vacuum jacket and toward the low portion 33. The fill line 23 also communicates with the interior of the inner vessel 11 after passing along through the vacuum jacket 21 and toward the low portion 33 thereof.

At a cost in heat loss, the fill line 23 and the discharge line 24 may be combined in a single fill-discharge line means. However, as shown in the drawings, the fill and discharge lines are preferably separate and the fill line 23 surrounds the discharge line 24.

In less refined apparatus, the inner vessel may be vented through a small vent line (not shown) extending from the inner vessel 11 to the outer shell 12 along a preferably long path to minimize heat inleak. However, as shown in the drawings, the vent line 22 desirably jackets the fill and discharge lines 23, 24 within the vacuum jacket 21 between the conduit-receiving portion of the vacuum jacket and the low portion 33 of the vacuum jacket, and thence extends along an upwardly extending vent line portion 32 toward the top of the inner vessel 11 as shown in FIGURES 1 and 2.

In an arrangement that is illustrated in FIGURE 2, and is preferred for tanks of some capacities, there may be provided an upwardly extending portion 41 of the vacuum jacket 21, such upwardly extending portion being in surrounding relationship with the upwardly extending portion 32 of the vent line 22.

As shown in the drawings, the top of the vent line 32 may be provided with a short reversely extending portion 42 supported on the wall of the inner vessel 11. A downwardly facing mouth 43 is formed at the low end of the reversely extending portion 42. The level of this mouth defines the depth of the ullage space 18 in the filled condition of the container. The vent line 32 may be used as a "full" trycock line. When the vessel reaches its filled condition, the mouth 43 is covered and liquid starts to be discharged by the fill line, indicating the full condition.

Structural support for the head end of the inner vessel is afforded by the fluid conduits via the member 35. The insulation afforded by the vacuum jacketing of the fill-discharge conduits 23, 24 (such insulation being preferably enhanced by further jacketing of these members by the vent line 22, and insulation of the discharge line 24 being even further enhanced by jacketing by the inlet line 23) causes the inner ends of these conduits to be relatively warm, and this, together with the downwardly extending configuration of the conduits assures that the liquid-gas interfaces within the conduits will be relatively near these inner ends when liquefied gas is stored in the Dewar. Percolation and convection within these conduits is minimized or eliminated, and heat loss is low, but good structural support is given without the use of supplemental structural supports at the head end of the Dewar.

The invention is not restricted to the slavish imitation of each and every one of the details described above which have been set forth merely by way of example with the intent of most clearly setting forth the teachings of the invention. Obviously devices may be provided which change, eliminate or add certain specific structural details without departing from the invention.

What is claimed is:

1. A horizontally oriented Dewar comprising an inner vessel for holding cold liquefied gas, an outer shell, a vacuum space between said inner vessel and outer shell, conduit means including vent line means communicating with the interior of said inner vessel near the top thereof, said conduit means also including fill-discharge line means extending from the exterior at or near the center of one end of the vessel straight across the vacuum space and into and along a vacuum jacket within said inner vessel, the outer end of said vacuum jacket being spaced interiorly from said outer shell, said vacuum jacket extending from its conduit-receiving portion downwardly within the inner vessel at least to a low portion near the bottom of the inner vessel, said fill-discharge line means communicating with the interior of said inner vessel near the bottom thereof and after passing along through said vacuum jacket and toward the low portion thereof.

2. A container construction as set forth in claim 1 in which there is a structural interconnection between said inner vessel and said conduit means at or near the conduit-receiving portion of said vacuum jacket.

3. A horizontally oriented Dewar comprising an inner vessel for holding cold liquefied gas, an outer shell, a vacuum space between said inner vessel and outer shell, conduit means including vent line means communicating with the interior of said inner vessel near the top thereof, said conduit means also including fill-discharge line means extending from the exterior at or near the center of one end of the vessel straight across the vacuum space and into and along a vacuum jacket within said inner vessel, the outer end of said vacuum jacket being spaced interiorly from said outer shell, said vacuum jacket extending from its conduit-receiving portion downwardly within the inner vessel at least to a low portion near the bottom of the inner vessel, at least the discharge line means of said fill-discharge line means communicating with the interior of said inner vessel near the bottom thereof and after passing along through said vacuum jacket and toward the low portion thereof, the fill line means of said fill-discharge line means also communicating with the interior of said inner vessel after passing along through said vacuum jacket and toward the low portion thereof.

4. A container construction as set forth in claim 3 in which there is a structural interconnection between the inner vessel and said conduit means at or near the conduit-receiving portion of said vacuum jacket.

5. A container construction as set forth in claim 4 in which said fill-discharge line means comprises separate fill line means and discharge line means.

6. A container construction as set forth in claim 5 in which said fill-discharge line means comprises fill line means in surrounding relationship with said discharge line means.

7. A horizontally oriented Dewar comprising an inner vessel for holding cold liquefied gas, an outer shell, a vacuum space between said inner vessel and outer shell, conduit means comprising vent line means and fill-discharge line means both extending from the exterior at or near the center of one end of the vessel straight across the vacuum space and into and along a vacuum jacket within said inner vessel, the outer end of said vacuum jacket being spaced interiorly from said outer shell, said vacuum jacket extending from its conduit-receiving portion downwardly within the inner vesel at least to a low portion near the bottom of the inner vessel, at least the discharge line means of said fill-discharge line means communicating with the interior of said inner vessel near the bottom thereof and after passing along through said vacuum jacket and toward the low portion thereof, the fill line means of said fill-discharge line means also communicating with the interior of said inner vessel after passing along through said vacuum jacket and toward the low portion thereof, said vent line means communicating with the interior of said inner vessel near the top thereof and after passing along through said vacuum jacket and toward the low portion thereof and thence toward the top of the inner vessel.

8. A container construction as set forth in claim 7 in which there is a structural interconnection between said inner vessel and said conduit means at or near the conduit-receiving portion of said vacuum jacket.

9. A container construction as set forth in claim 8 in which said vent line means is in surrounding relationship with said fill-discharge line means within said vacuum jacket between the conduit-receiving portion of the vacuum jacket and the low portion of the vacuum jacket.

10. A container construction as set forth in claim 9 in which said fill-discharge line means comprises separate fill line means and discharge line means.

11. A container construction as set forth in claim 10 in which said fill-discharge line means comprises fill line means in surrounding relationship with said discharge line means.

12. A container construction as in claim 8 in which the vent line means communicates with the interior of said inner vessel near the top thereof through a downwardly facing mouth, whereby the ullage space of said container is temporarily isolated from the interior of said line upon completion of filling when the filling liquid covers said mouth so that the vent line may operate with a full trycock to determine when the tank is filled.

13. A container construction as set forth in claim 12 in which said vacuum jacket extends from its said low point toward the top of said inner vessel in surrounding relationship with said vent line means.

References Cited

UNITED STATES PATENTS

| 3,044,270 | 7/1962 | Biever | 62—55 |
| 3,122,004 | 2/1964 | Aberle et al. | 62—45 |
| 3,201,946 | 8/1965 | Pauliukonis | 62—45 |
| 3,306,059 | 2/1967 | Stelts et al. | 62—45 |

FOREIGN PATENTS

| 924,755 | 5/1963 | Great Britain. |

LLOYD L. KING, *Primary Examiner.*